United States Patent
Qiu et al.

(10) Patent No.: US 12,196,997 B2
(45) Date of Patent: Jan. 14, 2025

(54) DISPLAY SCREEN AND MOBILE TERMINAL

(71) Applicant: HUIZHOU TCL MOBILE COMMUNICATION CO., LTD., Guangdong (CN)

(72) Inventors: Zhuwei Qiu, Guangdong (CN); Jitao Ma, Guangdong (CN); Ke Lin, Guangdong (CN); Ping Chen, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/691,880

(22) PCT Filed: Jul. 29, 2022

(86) PCT No.: PCT/CN2022/108907
§ 371 (c)(1),
(2) Date: Mar. 13, 2024

(87) PCT Pub. No.: WO2023/045559
PCT Pub. Date: Mar. 30, 2023

(65) Prior Publication Data
US 2024/0377571 A1    Nov. 14, 2024

(30) Foreign Application Priority Data
Sep. 24, 2021 (CN) .......................... 202122328839.6

(51) Int. Cl.
*F21V 8/00* (2006.01)
*G02B 5/30* (2006.01)
*G06F 3/041* (2006.01)

(52) U.S. Cl.
CPC ......... *G02B 6/0025* (2013.01); *G02B 5/3025* (2013.01); *G02B 6/0031* (2013.01); *G06F 3/0412* (2013.01)

(58) Field of Classification Search
None
See application file for complete search history.

(56) References Cited

FOREIGN PATENT DOCUMENTS

| CN | 103885635 A | 6/2014 |
|---|---|---|
| CN | 103982827 A | 8/2014 |

(Continued)

OTHER PUBLICATIONS

International Search Report in International application No. PCT/CN2022/108907, mailed on Nov. 2, 2022.

(Continued)

*Primary Examiner* — Ashok Patel
(74) *Attorney, Agent, or Firm* — PV IP PC; Wei Te Chung

(57) ABSTRACT

A display screen (12) includes: a touch panel (1201), an optical adhesive layer (1202) disposed below the touch panel (1201), a light guide plate (1211) disposed below the optical adhesive layer (1202), and a light emitting member (1213) configured to emit light. The light guide plate (1211) includes a light guide plate layer and a diffusion layer disposed on an upper surface of the light guide plate layer, and the diffusion layer is configured to diffusely reflect light emitted by the light emitting member (1213). The optical adhesive layer (1202) includes diffusion particles for atomizing light transmitted through the light guide plate (1211).

20 Claims, 2 Drawing Sheets

(56) References Cited

FOREIGN PATENT DOCUMENTS

| | | |
|---|---|---|
| CN | 204285128 U | 4/2015 |
| CN | 204883112 U | 12/2015 |
| CN | 108732811 A | 11/2018 |
| CN | 209805867 | * 12/2019 |
| CN | 215932308 U | 3/2022 |
| JP | 2003315787 A | 11/2003 |
| JP | 2007178758 A | 7/2007 |
| JP | 2001-324713 | * 11/2011 |
| KR | 20070060816 A | 6/2007 |

OTHER PUBLICATIONS

Written Opinion of the International Search Authority in International application No. PCT/CN2022/108907, mailed on Nov. 2, 2022.

* cited by examiner

DISPLAY SCREEN AND MOBILE TERMINAL

This application claims priority to Chinese Patent Application No. 202122328839.6, filed with the China National Intellectual Property Administration on Sep. 24, 2021 and entitled "DISPLAY SCREEN AND MOBILE TERMINAL", which is incorporated herein by reference in its entirety.

TECHNICAL FIELD

The present disclosure relates to a field of mobile terminals, and more particularly, to a display screen and a mobile terminal.

BACKGROUND

A display screen is an input/output device of a terminal and is a display tool that displays an electronic document on a screen through a specific transmission device and then reflects the electronic document to the human eye.

In the related art, to ensure that the user can view clearly the content displayed on the display screen, the illumination of the display screen is set to a greater level.

SUMMARY

Technical Problem

An embodiment of the present disclosure provides a display screen and a mobile terminal, to solve the technical problem that glare may be easily generated due to a high-illumination display screen under a light source, thereby causing user eye fatigue.

Technical Solutions for Problem

Technical Solutions

According to a first aspect, an embodiment of the present disclosure provides a display screen including a touch panel, an optical adhesive layer disposed below the touch panel, a light guide plate disposed below the optical adhesive layer, and a light emitting member configured to emit light, wherein the light passes through the light guide plate and the optical adhesive layer towards the touch panel;

The light guide plate includes a light guide plate layer and a diffusion layer disposed on an upper surface of the light guide plate layer, and the diffusion layer is configured to diffusely reflect light emitted by the light emitting member;

The optical adhesive layer includes diffusion particles for atomizing light transmitted through the light guide plate.

In some embodiments, the diffusion layer is a diffusion coating layer or a bump structure layer for diffusing the light emitted by the light emitting member.

In some embodiments, the display screen further includes a polarizer, the polarizer is provided between the optical adhesive layer and the light guide plate, and the polarizer has a matte surface.

In some embodiments, the display screen further includes a plurality of diffusion film layers disposed between the polarizer and the light guide plate.

In some embodiments, the display screen further includes a light shielding tape, and the light shielding tape is provided between the polarizer and the diffusion film layers.

In some embodiments, the display screen further includes a color filter and a thin film transistor, the polarizer includes an upper polarizer and a lower polarizer, the color filter is disposed between the upper polarizer and the lower polarizer, and the thin film transistor is disposed between the color filter and the lower polarizer.

In some embodiments, the touch panel includes a glass reflection surface, and the glass reflection surface is matte.

In some embodiments, the display screen further includes a reflection sheet, and the reflection sheet is provided below the light guide plate.

In some embodiments, the display screen further includes an adhesive frame for holding the light guide plate and the reflection sheet, an iron frame for protecting the display screen, and a peripheral wrapping tape disposed around the display screen.

According to a second aspect, an embodiment of the present disclosure further provides a mobile terminal including a housing, a circuit board, and a display screen, wherein the circuit board is mounted in the housing, the display screen is received in the housing to form a closed space with the housing, and the display screen is electrically connected to the circuit board.

Beneficial Effect of the Invention

Beneficial Effect

A display screen according to an embodiment of the present disclosure includes a touch panel, an optical adhesive layer disposed below the touch panel, a light guide plate disposed below the optical adhesive layer, and a light emitting member configured to emit light, wherein the light passes through the light guide plate and the optical adhesive layer towards the touch panel, wherein the light guide plate includes a light guide plate layer and a diffusion layer disposed on an upper surface of the light guide plate layer, and the diffusion layer is configured to diffusely reflect light emitted by the light emitting member, and wherein the optical adhesive layer includes diffusion particles for atomizing light transmitted through the light guide plate. The light emitted by the light emitting member is diffusely reflected by the diffusion layer of the light guide plate and the diffusion particles of the optical adhesive layer, thereby avoiding glare caused by high-brightness light, thereby reducing the stimulation of the high-brightness display screen to the human eye.

DETAILED DESCRIPTION

Figure 1:
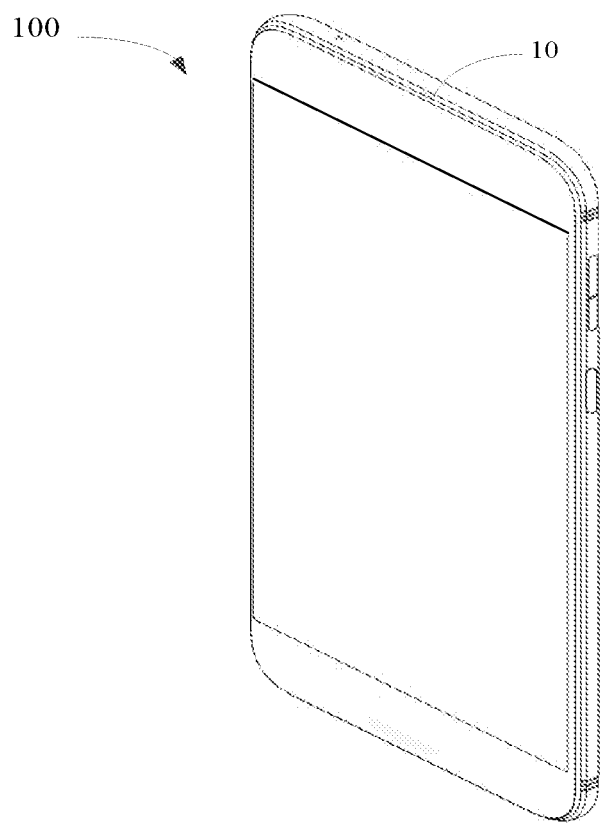
FIG. 1 is a schematic block view of a terminal device according to a third embodiment of the present disclosure.

Technical solutions in embodiments of the present disclosure will be clearly and completely described with reference to accompanying drawings in the embodiments of the present disclosure. It will be apparent that the described embodiments are only part of the embodiments of the present disclosure, and not all embodiments. Based on the embodiments in the present disclosure, all other embodiments obtained by a person skilled in the art without involving any creative labor are within the scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and/or "counterclockwise" are based on orientations or position relationships illustrated in the drawings. The terms are used to facilitate and simplify the description of the present disclosure, rather than indicate or imply that the devices or elements referred to herein are required to have specific orientations or be constructed or operate in specific orientations. Accordingly, the terms should not be construed as limiting the present disclosure. In addition, the terms "first", and "second" are for descriptive purposes only and are not to be construed as indicating or imposing a relative importance or implicitly indicating the number of technical features indicated. Thus, a feature that is limited by "first", "second", or the like may expressly or implicitly include one or more of the features. In the description of the present disclosure, the meaning of "plural/plurality" is two or more, unless otherwise specifically defined.

In the description of the present disclosure, it is to be noted that the terms "mount", "connected", and "coupled" are to be understood in a broad sense, unless otherwise expressly defined and limited, and may mean, for example, fixed, detachable, or integral connection; or may mean a mechanical connection, an electrical connection, or in communication with each other. It may mean direct connection or indirect connection via an intermediate medium, and it may mean internal communication of the two elements or interaction of the two elements. The specific meaning of the above terms in the present disclosure may be understood by a person skilled in the art depending on the specific circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that the horizontal height of the first feature is lower than that of the second feature.

Before the embodiments are described, it is advantageous to define certain words and phrases in the present disclosure. The term "including/comprising" and its derivatives denote "including, but not limited to". The term "or" has an inclusive meaning, indicating "and/or". The phrases "being associated with . . . " and "being associated with this" and their derivatives may mean "including", "being included in", "being associated with", "containing", "being included therein", "being connected to or with", "being coupled to or coupled with", "being communicated to or with", "being collaborated with", "intersecting", "being juxtaposed", "in close proximity to", "bonded to or with", "having", "having the nature of", etc. The term "controller" denotes any device, system, or portion thereof that controls at least one operation, which may be implemented in hardware, firmware, or software, or some combination of at least two of the hardware, the firmware, or the software. It should be noted that the functions associated with any particular controller may be distributed or centralized locally or remotely. Definitions of certain words and phrases are provided in the present disclosure, and a person skilled in the art will appreciate that in many cases, if not most cases, these definitions apply to prior and future use of such defined words and phrases.

Many different implementations or embodiments for implementing the different structures are provided in the present disclosure. In order to simplify the context of the present disclosure, the parts and settings of certain embodiments are described below. They are only examples and are not intended to limit the present disclosure. In addition, reference numerals and/or reference symbols may be repeated in different implementations in the present application, such repetition is for purposes of simplicity and clarity, without itself indicating the relationship between the various implementations and/or arrangements discussed. In addition, the present disclosure provides examples of various specific processes and materials, but a person skilled in the art will recognize the application of other processes and/or the use of other materials.

Figure 2:
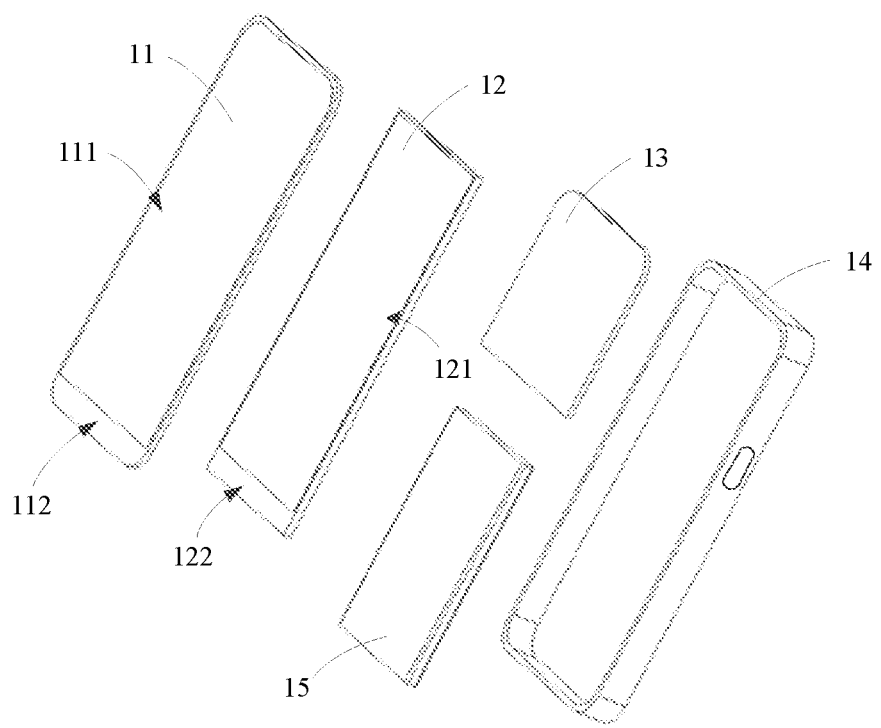
FIG. 2 is an exploded schematic diagram of a terminal 100 according to an embodiment of the present disclosure.

FIG. 1 is a schematic block view of a terminal device according to a third embodiment of the present disclosure. FIG. 2 is an exploded schematic diagram of a terminal 100 according to an embodiment of the present disclosure. FIGS. 1 and 2 illustrate a smartphone as a terminal 100. The present disclosure is not limited thereto, and the terminal according to an embodiment of the present disclosure may be a terminal including a display screen such as a personal computer (PC), a notebook PC, and a personal digital assistant (PDA).

Referring to FIGS. 1 and 2, a terminal 100 according to an exemplary implementation may include a terminal body 10.

Referring to FIG. 2, the terminal body 10 may include a cover plate 11, a display screen 12, a printed circuit board 13, and a housing 14. Further, the terminal 100 may further include a power supply 15. The display screen 12 may be electrically connected to the printed circuit board 13 via a flexible printed circuit. The printed circuit board 13 is disposed within the housing 14.

In addition, the terminal body 10 may include a functional component such as a sensor, a fingerprint module, and the like. It will be appreciated by those skilled in the art that the termination structure shown in FIG. 2 does not limit the terminal body in the present disclosure, and may include more or less components than illustrated, may combine certain components, or may include different component arrangements.

In some implementations, the cover plate 11 may be disposed in front of the display screen 12. In the present embodiment, "front" refers to the direction in which a side of the display screen 12 for displaying information is facing. "back" refers to a direction opposite to "front".

The cover plate 11 may have an exposure region 11 that exposes information displayed on the display screen 12, and a non-exposure region 12 for protection from external viewing. The non-exposure region 12 may include a light shielding layer, e.g., a black cushion layer, so that the interior of the terminal 100 may be protected from external viewing. In some embodiments, the light shielding layer is an ink layer.

The display screen 12 may be a liquid crystal display (LCD) for displaying an electronic file on a screen, and the display screen 12 may display information such as an image, a video, or text. The display screen 12 may include a front surface for displaying information, and a rear surface opposite to the front surface.

In some embodiments, as shown in FIG. 2, the display screen 12 may include a display region 121 for displaying information and a non-display region 122 that is not used to display information. The display region 121 may serve as a main display region of the display screen 12, and the main display region is configured to display most of the information. The non-display region 122 may be provided outside the display region 121. The non-display region 122 may be used to provide a region in which an integrated circuit (IC) for controlling information display of the display screen 12 is disposed. The non-exposure region 12 of the cover plate 11 may be disposed in front of the non-display region 122 of the display screen 12 and prevent the non-display region 122 of the display screen 12 from being externally visible.

Figure 3:
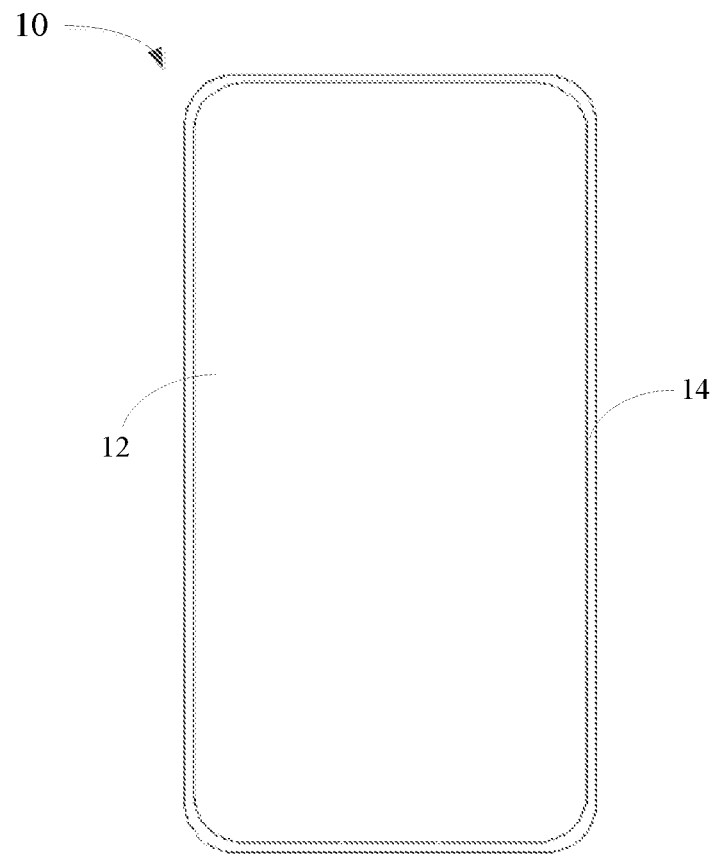
FIG. 3 is a front view of a terminal according to an embodiment of the present disclosure.

In some embodiments, referring to FIG. 3, FIG. 3 is a front view of the terminal 100. As shown in FIG. 3, the display screen 12 may be a bezel-free display screen. That is, the display screen 12 may include the display region 121, but not include the non-display region 122, to achieve a larger screen for displaying.

In some embodiments, the display screen 12 may be received in the housing 14, attached to side surfaces of the housing 14, and opposite to a rear surface of the housing 14, to form a closed space.

In some embodiments, the terminal body 10 includes a front surface and side surfaces connected to the front surface. In an embodiment, the front surface of the display screen 12 may be the front surface 12 of the terminal body 10, and the side surfaces of the housing 14 is the side surface of the terminal body 10.

Figure 4:
FIG. 4 is a schematic block view of a display screen according to an embodiment of the present disclosure.

Referring to FIG. 4, FIG. 4 is a schematic block view of a display screen 12 according to an embodiment of the present disclosure. As shown in FIG. 4, the display screen 12 may include a touch panel 1201, an optical adhesive layer 1202 disposed below the touch panel 1201, a light guide plate 1211 disposed below the optical adhesive layer 1202, and a light emitting member 1213 for emitting light. The light passes through the light guide plate 1211 and the optical adhesive layer 1202 to the touch panel 1201. The light emitting member 1213 may be a light emitting diode (LED). The light-emitting member 1213 may be used to provide a light source for a display screen.

The light guide plate 1211 may be configured to convert a line light source emitted by the light emitting member into a surface light source. The light guide plate 1211 may include a light guide plate layer and a diffusion layer disposed on an upper surface of the light guide plate layer. The diffusion layer is used to cause diffuse reflection of light emitted by the light emitting member.

The optical adhesive layer 1202 is formed of an optical adhesive, which may be a special adhesive for bonding the transparent optical element. It has colorless transparency, light transmittance of 90% or more, good cementitious strength, curing at room temperature or medium temperature, low curing shrinkage, and the like. The optical adhesive layer 1202 is used to adhere the touch panel 1201 to an upper polarizer via the optical adhesive.

Further, the optical adhesive layer 1202 may further include diffusion particles for atomizing light transmitted through the light guide plate 1211. In an implementation of the present disclosure, by doping the diffusion particles in the optical adhesive layer 1202, the light transmitted through the light guide plate 1211 may be atomized by the diffusion particles in the optical adhesive layer 1202, so that the light is diffusely reflected, thereby softening the display effect of the display screen and avoiding glare of the display screen.

in some implementations, the diffusion layer of the light guide plate 1211 is a diffusion coating layer or a bump structure layer for diffusing light emitted by the light emitting member. By adding a diffusion coating layer onto the upper surface of the light guide plate layer in the light guide plate 1211, or by adding a bump, that is, a bump structure layer, to the upper surface of the light guide plate layer, light is diffusely reflected when transmitted through the light guide plate 1211, so that the emitted light becomes softened, thereby reducing irritation to the human eye.

In some implementations, the display screen 12 may further include a polarizer through which a polarizing effect is generated to control the illumination intensity of the display screen. The polarizer is disposed between the optical adhesive layer 1202 and the light guide plate 1211. The polarizer may include an upper polarizer 1203 disposed between the optical adhesive layer 1202 and the light guide plate 1211 and a lower polarizer 1206 disposed between the upper polarizer 1203 and the light guide plate 1211.

In an implementation of the present disclosure, the polarizer has a matte surface. Specifically, by chemical etching or spraying, the surface of the polarizer may be changed to a matte surface (an uneven surface with particles), thereby changing the roughness of the surface of the polarizer, so that the surface of the polarizer has a matte effect, thereby achieving a diffuse reflection effect of light.

In some implementations, the display screen 12 may further include a plurality of diffusion film layers disposed between the polarizer and the light guide plate 1211. Specifically, the plurality of diffusion film layers may include a first diffusion film 1210, a second diffusion film 1209, a third diffusion film 1208, a fourth diffusion film 1207, and/or the like. The number of diffusion film layers is not limited herein. By providing the plurality of diffusion film layers, the light transmitted through the light guide plate 1211 may be further atomized to diffusely reflect the light, so as to make the visual effect of the display screen become soft.

In some implementations, the display screen 12 may further include a light shielding tape 1217 disposed between the polarizer and the diffuser film layers, that is, the diffusion film layers. The light shielding tape 1217 may be configured to shield the light around the backlight, so that the light in the visual area of the display screen is uniform and no light leaks.

In some implementations, the display screen 12 may further include a color filter 1204 disposed between the upper polarizer 1203 and the lower polarizer 1206 and a thin film transistor 1205 disposed between the color filter 1204 and the lower polarizer 1206. The color filter 1204 and the thin film transistor 1205 are configured for content display of the display screen.

In some implementations, the touch panel 1201 may include a glass reflection surface, which may be a matte surface. Specifically, by chemical etching or spraying, the surface of the glass reflection surface may be changed to a matte surface (an uneven surface with particles), thereby changing the roughness of the glass reflection surface, so that the surface of the glass reflection surface has a matte effect, thereby achieving a diffuse reflection effect of light.

In some implementations, the display screen 12 may further include a reflection sheet 1212 disposed below the light guide plate 1211. The reflection sheet 1212 may be configured to reflect light from the bottom of the light guide plate to the visible region for reuse.

In some implementations, the display screen 12 may further include an adhesive frame 1216 for holding the light guide plate 1211 and the reflection sheet 1212, an iron frame 1215 for protecting the display screen 12, and a peripheral wrapping tape 1214 disposed around the display screen 12.

The adhesive frame 1216 may be configured to fix the backlight film material, the light guide plate 1211, and the reflection sheet 1212, and carry the display screen 12. The iron frame 1215 may be configured to protect the backlight and the display screen. The peripheral wrapping tape 1214 may be configured to shield the periphery of the display screen, prevent light leakage of the display screen, and shield the electromagnetic interference.

The display screen 12 according to an embodiment of the present disclosure may include a touch panel 1201, an optical adhesive layer 1202 disposed below the touch panel 1201, a light guide plate 1211 disposed below the optical adhesive layer 1202, and a light emitting member 1213 for emitting light. The light passes through the light guide plate 1211 and the optical adhesive layer 1202 to the touch panel 1201. The light guide plate 1211 may include a light guide plate layer and a diffusion layer disposed on an upper surface of the light guide plate layer. The diffusion layer is used to cause diffuse reflection of light emitted by the light emitting member. The optical adhesive layer 1202 may further include diffusion particles for atomizing light transmitted through the light guide plate 1211. The light emitted by the light emitting member 1213 is diffusely reflected by the diffusion layer of the light guide plate 1211 and the diffusion particles of the optical adhesive layer 1202, thereby avoiding glare caused by high-brightness light, thereby reducing the stimulation of the high-brightness display screen to the human eye.

In the above-mentioned embodiments, each embodiment is described with its own emphasis. For parts that are not detailed in detail in a certain embodiment, reference may be made to the above detailed description of the device network configuration method, and details are not described herein again.

A display screen and mobile terminal according to an embodiment of the present disclosure is described in detail. A specific example is used herein to explain the principles and implementations of the present disclosure. The above embodiments are only used to help understand the technical solution and core ideas of the present disclosure. It will be appreciated by those of ordinary skill in the art that modifications may still be made to the technical solutions described in the foregoing embodiments, or equivalents may be made to some of the technical features therein. These modifications or equivalents do not depart the essence of the corresponding technical solutions from the scope of the technical solutions of the embodiments of the present disclosure.

What is claimed is:

1. A display screen, comprising: a touch panel, an optical adhesive layer disposed below the touch panel, a light guide plate disposed below the optical adhesive layer, and a light emitting member configured to emit light, wherein the light passes through the light guide plate and the optical adhesive layer towards the touch panel,
    wherein the light guide plate comprises a light guide plate layer and a diffusion layer disposed on an upper surface of the light guide plate layer, and the diffusion layer is configured to diffusely reflect light emitted by the light emitting member, and
    wherein the optical adhesive layer comprises diffusion particles for atomizing light transmitted through the light guide plate.

2. The display screen of claim 1, wherein the diffusion layer is a diffusion coating layer or a bump structure layer for diffusing the light emitted by the light emitting member.

3. The display screen of claim 1, wherein the display screen further comprises a polarizer, the polarizer is provided between the optical adhesive layer and the light guide plate, and the polarizer has a matte surface.

4. The display screen of claim 3, wherein the display screen further comprises a plurality of diffusion film layers disposed between the polarizer and the light guide plate.

5. The display screen of claim 4, wherein the display screen further comprises a light shielding tape, and the light shielding tape is provided between the polarizer and the diffusion film layers.

6. The display screen of claim 3, wherein the display screen further comprises a color filter and a thin film transistor, the polarizer comprises an upper polarizer and a lower polarizer, the color filter is disposed between the upper polarizer and the lower polarizer, and the thin film transistor is disposed between the color filter and the lower polarizer.

7. The display screen of claim 1, wherein the touch panel comprises a glass reflection surface, and the glass reflection surface is matte.

8. The display screen of claim 1, wherein the display screen further comprises a reflection sheet, and the reflection sheet is provided below the light guide plate.

9. The display screen of claim 8, wherein the display screen further comprises an adhesive frame for holding the light guide plate and the reflection sheet, an iron frame for protecting the display screen, and a peripheral wrapping tape disposed around the display screen.

10. The display screen of claim 1, wherein the optical adhesive layer comprises an optical adhesive, and the optical adhesive is a special adhesive for bonding the transparent optical element.

11. A mobile terminal comprises a housing, a circuit board, and a display screen, wherein the circuit board is mounted within the housing, the display screen is received in the housing to form an enclosed space with the housing, and the display screen is electrically connected to the circuit board,
    wherein the display screen comprises a touch panel, an optical adhesive layer disposed below the touch panel, a light guide plate disposed below the optical adhesive layer, and a light emitting member configured to emit light, wherein the light passes through the light guide plate and the optical adhesive layer towards the touch panel,
    wherein the light guide plate comprises a light guide plate layer and a diffusion layer disposed on an upper surface of the light guide plate layer, and the diffusion layer is configured to diffusely reflect light emitted by the light emitting member, and
    wherein the optical adhesive layer comprises diffusion particles for atomizing light transmitted through the light guide plate.

12. The mobile terminal of claim 11, wherein the diffusion layer is a diffusion coating layer or a bump structure layer for diffusing the light emitted by the light emitting member.

13. The mobile terminal of claim 11, wherein the display screen further comprises a polarizer, the polarizer is provided between the optical adhesive layer and the light guide plate, and the polarizer has a matte surface.

14. The mobile terminal of claim 13, wherein the display screen further comprises a plurality of diffusion film layers disposed between the polarizer and the light guide plate.

15. The mobile terminal of claim 14, wherein the display screen further comprises a light shielding tape, and the light shielding tape is provided between the polarizer and the diffusion film layers.

16. The mobile terminal of claim 13, wherein the display screen further comprises a color filter and a thin film transistor, the polarizer comprises an upper polarizer and a lower polarizer, the color filter is disposed between the upper polarizer and the lower polarizer, and the thin film transistor is disposed between the color filter and the lower polarizer.

17. The mobile terminal of claim 11, wherein the touch panel comprises a glass reflection surface, and the glass reflection surface is matte.

18. The mobile terminal of claim 11, wherein the display screen further comprises a reflection sheet, and the reflection sheet is provided below the light guide plate.

19. The mobile terminal of claim 18, wherein the display screen further comprises an adhesive frame for holding the light guide plate and the reflection sheet, an iron frame for protecting the display screen, and a peripheral wrapping tape disposed around the display screen.

20. The mobile terminal of claim 11, wherein the optical adhesive layer comprises an optical adhesive, and the optical adhesive is a special adhesive for bonding the transparent optical element.

* * * * *